United States Patent
Cheung

[19]

[11] Patent Number: 6,122,689
[45] Date of Patent: Sep. 19, 2000

[54] BUS TERMINATION CIRCUITRY AND METHODS FOR IMPLEMENTING THE SAME

[75] Inventor: Peter K. Cheung, Milpitas, Calif.

[73] Assignee: Adaptec, Inc., Milpitas, Calif.

[21] Appl. No.: 09/078,346

[22] Filed: May 13, 1998

[51] Int. Cl.[7] .................................................. G06F 13/00
[52] U.S. Cl. ..................... 710/101; 710/103; 710/104; 710/100
[58] Field of Search .................... 710/101, 100, 710/104, 103, 129

[56] References Cited

U.S. PATENT DOCUMENTS

| | | | |
|---|---|---|---|
| 5,535,336 | 7/1996 | Smith et al. | 340/825.07 |
| 5,706,447 | 1/1998 | Vivio | 710/129 |
| 5,751,977 | 5/1998 | Alexander | 710/126 |
| 5,953,540 | 9/1999 | Raymond | 395/882 |

OTHER PUBLICATIONS

Unknown, "ASUS PCI–DA2100 PCI to SCSI Disk Array Controller", User's Manual Hardware Installation, Rev. 1.22, Nov., 1996, ASUSTeK Computer, Inc.

Unkown, "ASUS P2L97–S Pentium II Motherboard", User's Manual, Rev. 1.05, Sep. 1997, ASUSTeK Computer, Inc.

Unknown, "ASUS P2L97 Pentium II Motherboard", User's Manual, Rev. 1.05, Sep. 1997, ASUSTeK Computer, Inc.

*Primary Examiner*—John A. Follansbee
*Assistant Examiner*—Mackly Monestine
*Attorney, Agent, or Firm*—Martine, Penilla & Kim, LLP

[57] ABSTRACT

Disclosed is a host adapter having automatic termination, and a method for implementing the automatic termination. The host adapter includes a first connector for connecting to at least one external peripheral device and a second connector for connecting to at least one internal peripheral device. The host adapter further includes a termination system circuit that is coupled between the first connector and the second connector. The termination system circuit is configured to produce bit data that is indicative of whether a peripheral device is coupled to one or both of the first connector and the second connector. Preferably, the termination system circuit communicates the bit data to a software termination engine upon boot-up to enable or disable a termination of the host adapter. Furthermore, the termination system circuit includes a termination control decoder and a tri-state buffer. The host adapter also includes a termination over-ride control that is configured to over-ride the automatic termination generated by the termination system circuit via a software control.

24 Claims, 9 Drawing Sheets

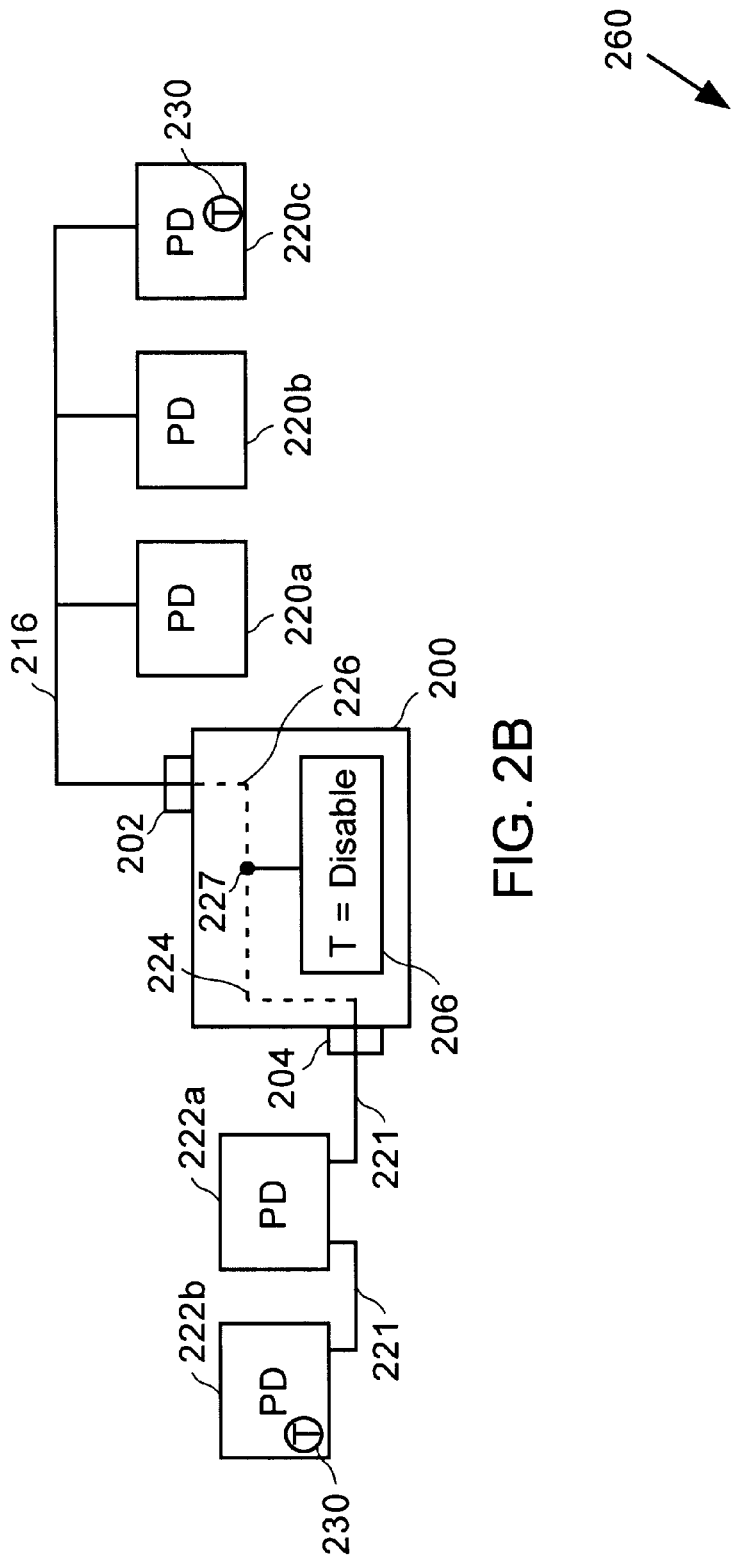

| Connector 202 | Connector 204 | Terminator Control |
|---|---|---|
| Cable Sense = Low (226) | Cable Sense = HIGH (224) | Termination = Enable (HIGH) |

| Connector 202 | Connector 204 | Terminator Control |
|---|---|---|
| Cable Sense = HIGH (226) | Cable Sense = Low (224) | Termination = ENABLE (HIGH) |
| Cable Sense = HIGH (226) | Cable Sense = HIGH (224) | Termination = ENABLE (HIGH) |

BUS TERMINATION CIRCUITRY AND METHODS FOR IMPLEMENTING THE SAME

BACKGROUND OF THE INVENTION

1. Field of the Invention

This invention relates generally to computer adapter cards, and more particularly to techniques for terminating a bus having peripheral devices connected thereto.

2. Description of the Related Art

As the power of applications, processors, and storage devices increase, high-end computer users are seeking ways to optimize their computer systems to achieve the highest level of performance. For example, most of today's computer systems are highly modular systems that enable them to be modified and equipped with just the right software and hardware. Typically, a computer's mother board includes several peripheral component interconnect (PCI) slots that are configured to receive adapter cards, such as SCSI adapter cards. These SCSI adapter cards act as a reliable and efficient interface between the host computer and any number of peripheral devices. In general, once a SCSI adapter card is inserted into the host computer's PCI slot, a SCSI bus (typically in the form of a ribbon cable) is used to interconnect one or more peripheral devices (also known as target devices) to the SCSI host adapter.

Although SCSI adapter technology is one of the most advanced techniques used to enable fast and efficient exchange of data between a computer and peripheral devices, the SCSI bus that interconnects the host adapter and its peripheral devices must be properly terminated. In general, even though a typical SCSI bus can make a connection to several peripheral devices, each end of the bus must be terminated. For example, if a SCSI bus has a hard drive at one end of the bus and a scanner at the other end, the termination circuitry of both the hard drive and the scanner should be enabled to ensure proper data transmission along the SCSI bus.

In today's more flexible host adapter implementations, host adapter cards typically have more than one built-in connector that enable interconnection to both internal and external peripheral devices. To facilitate this discussion, FIG. 1 shows a conventional computer system 100 that includes a host adapter 102. The host adapter 102 is generally configured to communicate with the CPU of the computer system 100 via a PCI bus or other well known communication buses. In this example, the host adapter 102 has two connectors 104a and 104b. The external connector 104b allows connection to external peripheral devices, such as peripheral device 110 that is coupled to the host adapter 102 via a SCSI cable 107 having a connector 108a. For external devices, up to 7 SCSI peripheral devices can be daisy-chained one to another. Internally, the host adapter 102 can be connected to internal peripheral devices 112a and 112b via connectors 108b that are physically part of a SCSI bus 105. The SCSI bus 105 is also shown connected via a connector 108b to the internal connector 104a of the host adapter 102.

In this exemplary configuration, the host adapter 102 has two connectors 104a and 104b that are respectively connected to external and internal peripheral devices. As a result, proper termination will require that peripheral devices 110 and 112b be responsible for terminating the SCSI bus. This is because peripheral devices 110 and 112b define the ends of the bus and the host adapter 102 physically lies between both ends of the bus. Consequently, the host adapter 102 must not be set for "termination" because it is not connected to one end of the SCSI bus. Of course, if the host adapter 102 did not have peripheral device 110 connected to connector 104b, the host adapter 102 would have to be set for termination because it would define one end of the bus. This would also apply if the host adapter 102 was only connected to peripheral device 110 and no internal peripheral devices were connected to the SCSI bus 105.

In efforts to automate the configuration of proper termination settings on the host adapter 102, several software-only termination techniques have been used. Initially, the software is charged with determining which type of host adapter model is connected to the host computer system. As is well known, the rapid design and development of SCSI host adapters has led to the creation of a tremendous variety of host adapters, each having a custom number of connectors that support various bandwidth capabilities. Therefore, any software that is developed to detect when peripheral devices are connected between physical connectors (i.e., 104a/104b) must be able access all of the configuration data for that host adapter.

To accomplish this, host adapter termination software is conventionally provided with multitude of look up tables that hold the connector configuration information for associated host adapters. However, as more host adapters are designed and placed on the market, new unique look up tables have to be created and integrated into the host adapter termination software. As can be appreciated, this continual creation of unique lookup tables can be very burdensome and time consuming in view of the rapid pace in which new products created and marketed to the public. In fact, when a large number of lookup tables have to be accounted for and managed by the termination software, many times the termination software will erroneously enable the termination of the host adapter 102, even when there are peripheral devices connected to both internal and external connectors. In addition, when users initially set up there host adapter termination, complicated setup dialogs have to be properly configured before the termination software can automatically sense when devices are connected to the host adapter's connectors and then set the termination of the host adapter 102.

In view of the foregoing, there is a need for circuitry that automatically assists generic termination software to set the termination state of a host adapter depending on the circuitry's detection of connected peripheral devices.

SUMMARY OF THE INVENTION

Broadly speaking, the present invention fills these needs by providing a termination system circuit on a host adapter that monitors bus connection to any connector of the host adapter in order to generate a bit data that enables standard termination software to set the host adapter's termination state. In another embodiment, a termination over-ride control is provided to disable the termination setting determined by the termination system circuit. It should be appreciated that the present invention can be implemented in numerous ways, including as a process, an apparatus, a system, a device, a method, or a computer readable medium. Several inventive embodiments of the present invention are described below.

In one embodiment, a host adapter having automatic termination is disclosed. The host adapter includes a first connector for connecting to at least one external peripheral device and a second connector for connecting to at least one internal peripheral device. The host adapter further includes a termination system circuit that is coupled between the first connector and the second connector. The termination system circuit is configured to produce bit data that is indicative of whether a peripheral device is coupled to one or both of the first connector and the second connector. Preferably, the termination system circuit communicates the bit data to a software termination engine upon boot-up to enable or disable a termination of the host adapter. Furthermore, the termination system circuit includes a termination control decoder and a tri-state buffer. The host adapter also includes a termination over-ride control that is configured to over-ride the automatic termination generated by the termination system circuit via a software control.

In another embodiment, a method for performing automatic termination of a host adapter having a first connector and a second connector is disclosed. The method includes detecting a first cable sense signal from the first connector and detecting a second cable sense signal from the second connector. The method further includes analyzing the first cable sense signal and second cable sense signal to produce a bit data that is indicative of an enabling or disabling of a termination of the host adapter. Further, the method includes setting the enabling or disabling of the termination upon boot-up of a host computer system that is in communication with the host adapter.

In yet a further embodiment, a host adapter card having automatic termination is disclosed. The host adapter card includes a first connector means for connecting to at least one external peripheral device and a second connector means for connecting to at least one internal peripheral device. The host adapter card further includes a termination system means that is coupled between the first connector means and the second connector means. The termination system means is configured to produce bit data that is indicative of whether a peripheral device is coupled to one or both of the first connector means and the second connector means. Further, the termination system means is preferably configured to communicate the bit data to a termination engine upon boot-up to enable or disable a termination means of the host adapter.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2B illustrates a simplified example of FIG. 2A in which the host adapter chip has its termination disabled because the host adapter chip is connected in the middle of the SCSI bus.

FIGS. 2C and 2E–2F are tables that illustrate the termination state of the host adapter in response to the cable sense signals received from the host adapter card's connectors in accordance with one embodiment of the present invention.

FIG. 2D illustrates a simplified example of when only one connector of the host adapter card is connected to a peripheral device.

DETAILED DESCRIPTION OF THE PREFERRED EMBODIMENTS

An invention is described for a termination system circuit on a host adapter that monitors bus connection to any connector of the host adapter in order to generate a bit data that enables standard termination software to set the host adapter's termination state. It will be obvious, however, to one skilled in the art, that the present invention may be practiced without some or all of these specific details. In other instances, well known process operations have not been described in detail in order not to unnecessarily obscure the present invention.

Figure 1:
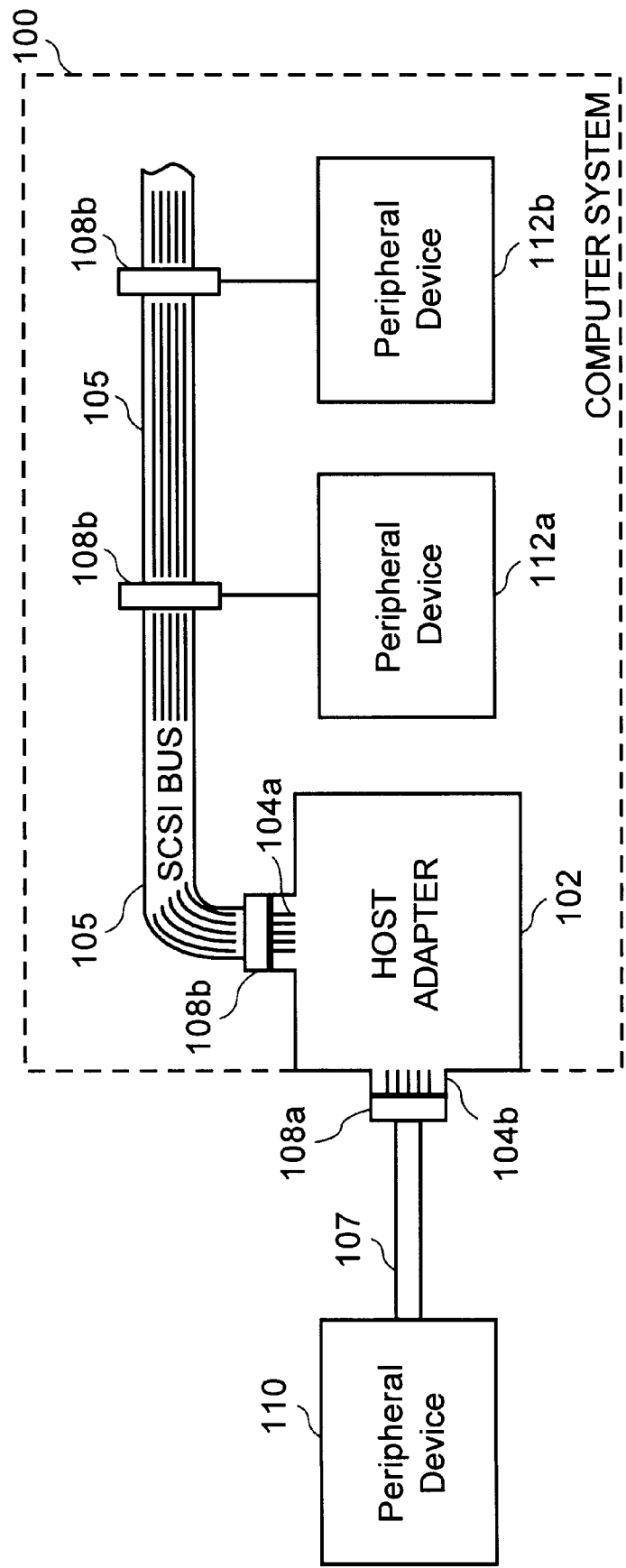
FIG. 1 shows a conventional computer system that has a host adapter connected to several peripheral devices.
Figure 2A:
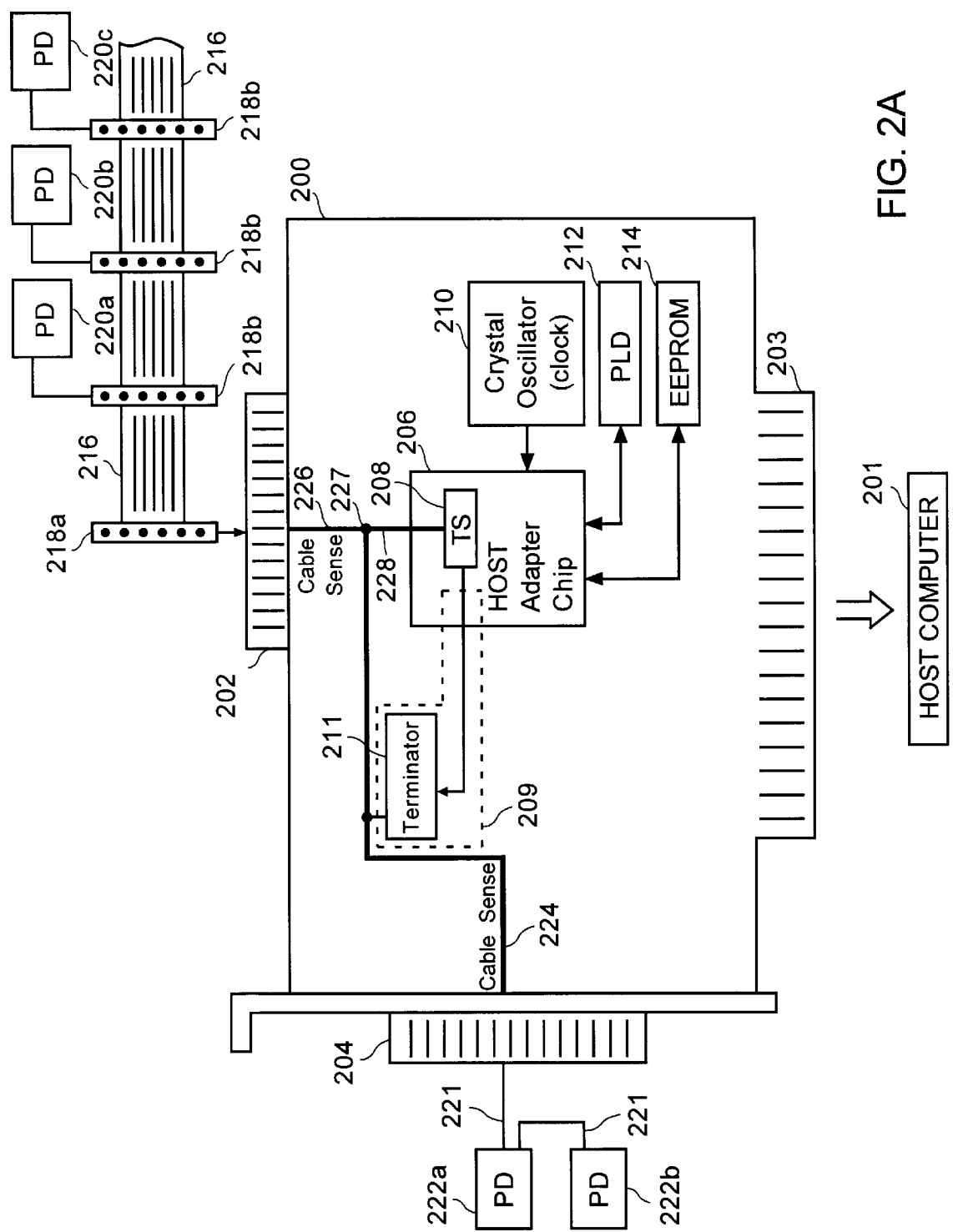
FIG. 2A shows a simplified diagram of an adapter card having a host adapter chip that includes termination system circuitry in accordance with one embodiment of the present invention.

FIG. 2A shows a simplified diagram of an adapter card 200 having a host adapter chip 206 that includes termination system circuitry 208 in accordance with one embodiment of the present invention. As shown, the host adapter card 200 includes an internal connector 202, and an external connector 204 which will be accessible from outside of the host computer's housing. Accordingly, the internal connector 202 can be connected up to a SCSI bus 216 via a connector 218a. The SCSI bus 216 also has several other connectors 218b, which may connect up to peripheral devices 220a, 220b, and 220c.

As is well known, depending on the specific SCSI specification, different types of connectors 202, 204, and 218 may be used to make interconnection to the adapter card 200. For example, there are several types of 50 pin connectors and 68 pin connectors which provide 8-bit and 16-bit wide data paths, respectively. Also shown are external peripheral devices (PDs) 222a and 222b, which are daisy-chained via a SCSI cable 221, to the external connector 204. Typically, up to seven peripheral devices 222 may be daisy-chained up to an external connector 204. The external peripheral devices 222 are thus internally routed via a bus segment 224 and 228, to the termination system circuitry 208 of the host adapter chip 206. The internal peripheral devices 220 are likewise coupled through the SCSI bus 216, internal connector 202, a bus segment 226, and bus segment 228.

In this simplified example, the host adapter chip 206 receives a clock signal from a crystal oscillator 210 to establish the appropriate timing parameters for the host adapter card 200. Also included is a standard programmable logic device (PLD) 212, which is programmed with the identification codes "IDs" to operate as an initiator, as opposed to a terminator. The host adapter card 200 also has a EEPROM 214 memory device, which is configured to store the initialization code that will be used during the host computer's boot-up process. The host adapter card 200 also includes a PCI connector 203 which is configured to be coupled up to a PCI connector that is integrated into the motherboard of a host computer system 201.

Continuing with example provided in FIG. 2A, the host adapter chip 206 will lie between two ends of a SCSI bus because there are peripheral devices connected to both the external connector 204 and the internal connector 202. To further elaborate, peripheral device 220*c*, which is connected to the SCSI bus 216, defines a first end of the SCSI bus (assuming that it is a last peripheral device connected to the SCSI bus 216), and peripheral device 222*b* will be the second end of the SCSI bus. As a result, the host adapter chip 206 will be connected to the SCSI bus at a point 227 that is between bus segments 224 and 226.

Consequently, the termination system circuitry 208 should not allow the host adapter chip 206 to enable its external termination circuitry 209 having a terminator 211. On the other hand, in accordance with one embodiment of the present invention, the termination system circuitry 208 will intelligently monitor whether there are peripheral devices connected to both the internal connector 202 and the external connector 204 to determine whether the host adapter chip 206 should or should not enable its termination circuitry. In this embodiment, the termination system circuitry 208 is configured to detect a cable sense signal along the bus segments 224 and 226 to determine when a SCSI device is plugged into one or both of the connectors 202 and 204 of the adapter card 200, and then set the appropriate termination.

As will be described in greater detail below, when a cable sense signal along the bus segments 224 or 226 are in a LOW state, a SCSI device will be plugged into the connector that is coupled to that bus segment. On the other hand, when the cable sense signal is in a logical HIGH state, this will indicate that no SCSI device is plugged into the connector that is coupled to that bus segment. Based on this information, the termination system circuitry will produce bit data which will be transferred to the termination software which is run on the host computer 201 to ascertain whether the host adapter chip 206 should have its termination circuitry disabled or enabled.

FIG. 2B illustrates a simplified example of FIG. 2A in which the host adapter chip 206 has its termination disabled because the host adapter chip lies at a point 227 that is in the middle of the SCSI bus. In this configuration, the SCSI bus should be terminated 230 at peripheral devices 222*b* and 220*c* because they define the ends of the SCSI bus. As mentioned above, the termination system circuitry 208 of the host adapter chip 206 will monitor the bus segments 224 and 226 to read the cable sense signals in determining whether the host adapter chip 206 should be enabled or disabled.

As illustrated in a simplified table 260, when connector 202 has one or more peripheral devices connected thereto, the cable sense signal over the bus segment 226 will be in a logical LOW state. Likewise, when the connector 204 is also connected to at least one or more peripheral devices, the cable sense signal along the bus segment 224 will be in a LOW state. As a result of measuring the cable sense signals along these two bus segments, a terminator control will be set to "disable" the termination circuitry of the host adapter chip 206. In this simplified example, the logical equation performed to determine the terminator control is as follows:

Terminator control=(SCSI connector 202) OR (SCSI connector 204)

As will be described in greater detail with respect to FIG. 3A, a termination control decoder contained within the termination system circuitry 208 will include one or more logic gates (e.g., such as an OR gate) that decode the cable sense signals along the bus segments 224 and 226, and output control bit(s) data for generic termination software to read. Of course, the number of control bits output depends on the number of monitored connectors that are part of a particular host adapter card.

Figures 2D, 2E, 2F:
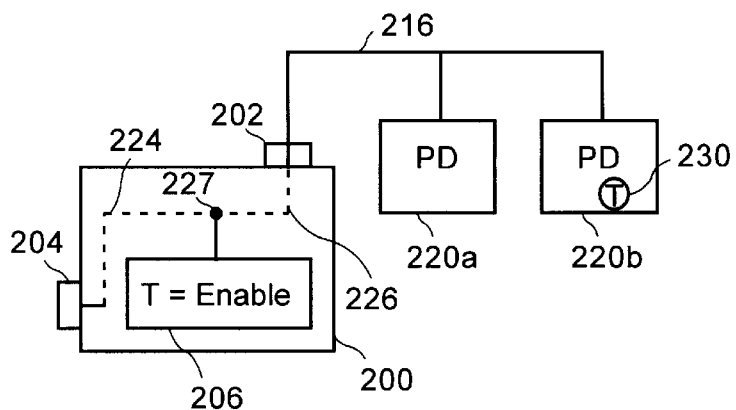

FIG. 2D shows another example in which the host adapter chip 206 of the host adapter card 200 has its termination enabled in accordance with one embodiment of the present invention. In this embodiment, the cable sense signal received from bus segment 224 will be in a logical HIGH state, and the cable sense signal over the bus segment 226 will be in a logical LOW state, as shown in Table 262 of FIG. 2E. As a result of monitoring these two logical states, the terminator control will be set to enable the termination circuitry of the host adapter chip 206. It should also be noted that in this example, the host adapter chip 206 defines one end of the SCSI bus, and the peripheral device 220*b*, which is terminated 230 defines the other end of the SCSI bus.

FIG. 2F shows yet another table 264, which illustrates two more scenarios that each require the host adapter chip 206 to be in an enabled state. For example, when the cable sense signal over bus segment 226 is in a HIGH state and the cable sense signal over bus segment 224 is in a LOW state, the terminator control will require the host adapter chip 206 to be in an enabled state. This scenario is presented when no peripheral device is connected to connector 202, and at least one peripheral device is connected to connector 204.

For completeness, if no peripheral device is connected to either connectors 202 or 204, the cable sense signals along bus segments 224 and 226 will each be in a logical HIGH state, which will also require the host adapter chip 206 to be in an enabled state. As a result, the default state of the host adapter chip will be to have its termination in an enabled state.

Figure 3B:
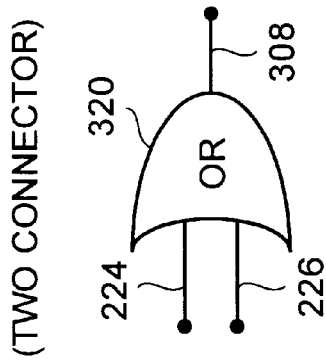
FIG. 3B illustrates one example of a logic gate that may be implemented as part of a termination control decoder of the termination system circuitry in accordance with one embodiment of the present invention.
Figure 3A:
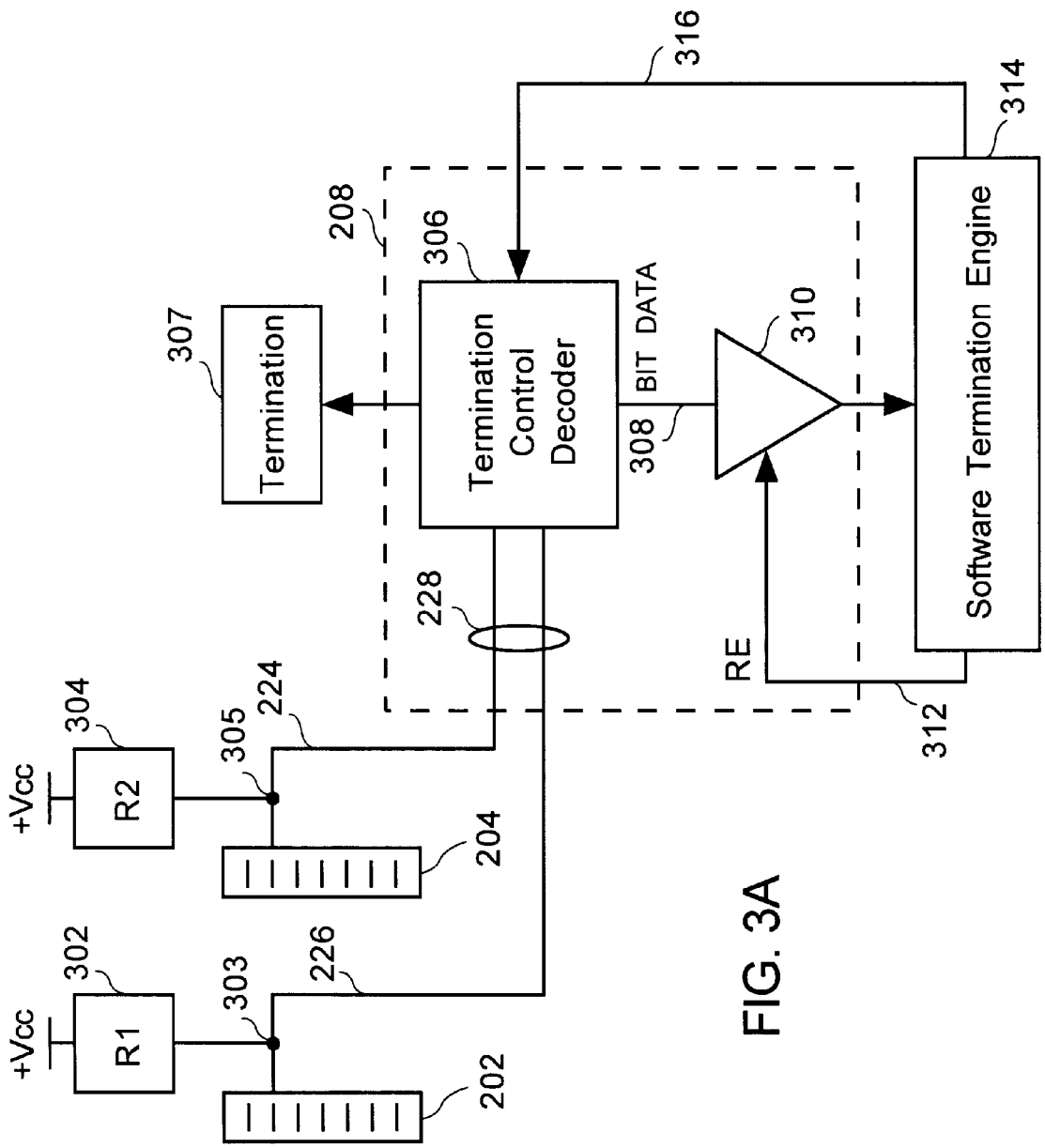
FIG. 3A shows a more detailed diagram of the termination system circuitry in accordance with one embodiment of the present invention.

FIG. 3A shows a more detailed diagram of the termination system circuitry 208 in accordance with one embodiment of the present invention. As shown, each of the connectors 202 and 204 are connected at nodes 303 and 305 to pull-up resistors 302 and 304. The pull-up resistors 302 and 304 are shown coupled to a positive Vcc voltage. In general, the pull-up resistors 302 and 304 are used to pull up the cable sense signals when no peripheral devices are connected to the connectors 202 or 204.

As a result, the cable sense signal along bus segments 224 and 226 will remain in a logical HIGH state (due to the pull-up resistors 302 and 304) when no SCSI device is connected to the connectors 202 or 204. However, when a peripheral device is connected to a particular connector 202 or 204, the cable sense signal will be pulled down to a logical LOW state by the peripheral device's ground pin. Accordingly, the cable sense signals, whether they be in a HIGH or LOW logical state, are transferred to the termination system circuitry 208 over bus segment 228, which includes input lines from both bus segments 224 and 226.

Bus segments 224 and 226 therefore couple up to a termination control decoder 306 which is part of the termination system circuitry 208. In one embodiment, the termination control decoder 306 will read the cable sense signals provided over bus segments 224 and 226 to determine the logical state of the output bit data that is provided to line 308. For example, if a SCSI device is connected to both connectors 202 and 204, the cable sense signals 224 and 226 will each be in a logical LOW state that is provided to the termination control decoder 306. The termination control decoder 306 will then output a logical LOW bit data onto line 308 which is passed to a tri-state buffer 310. The bit data is therefore stored in the tri-state buffer 310 until a read-enable (RE) signal 312 is provided by a software termination engine 314, which is run on the host computer system CPU.

More specifically, when the software termination engine 314 desires to read the data stored in the tri-state buffer 310, it will initiate a read-enable signal 312, which will produce a read from the tri-state buffer 310 that is passed to the software termination engine 314. Then, the software termination engine 314 will output the bit data received from the tri-state buffer 310 to the termination control decoder 306 via a signal 316. At that point, the termination control decoder 306 will set the termination 307 of the host adapter chip 206. It should be appreciated that the software termination engine 314 no longer needs to store and continually update a multiplicity of lookup tables that are uniquely configured for each type of host adapter chip 206.

In the contrary, each host adapter chip 206 will include its own termination system circuitry 208 built into its circuitry which will enable it to communicate with a generic software termination engine 314. The software termination engine 314 will therefore be able to perform a simple write operation of the bit data read from the termination system circuitry 208 to allow the setting of the termination 307. In this simplified example, the termination control decoder may include an OR gate 320 as shown in FIG. 3B, which will receive inputs from the bus segment 224 and the bus segment 226, and output the bit data signal 308 to the tri-state buffer 310. Of course, other suitable logic circuitry may be integrated into the termination control decoder 306 to accommodate the reading of cable sense signals when more than two connectors are integrated into a single host adapter card 200.

Figure 4:
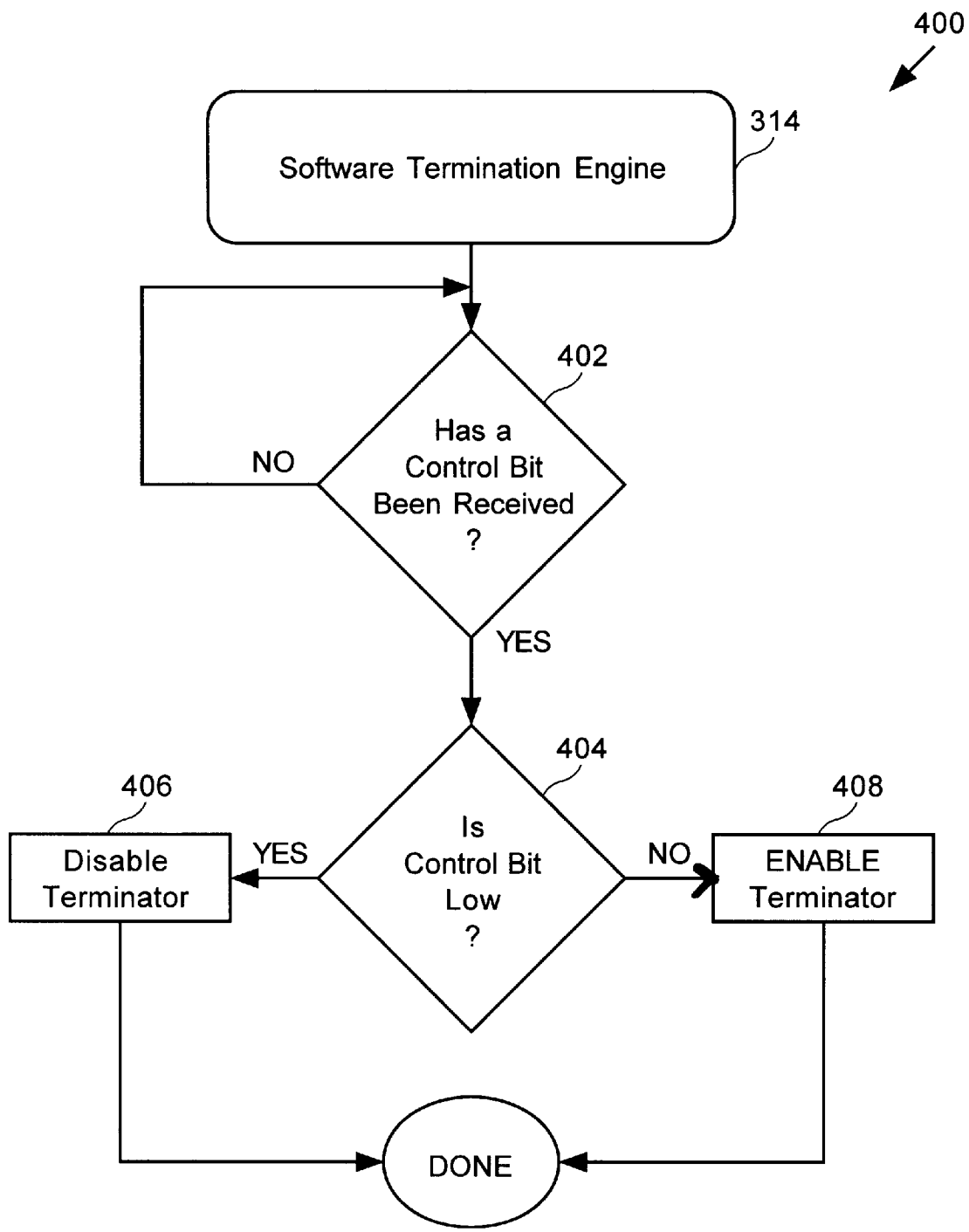
FIG. 4 shows a logic diagram illustrating the operations performed by a software termination engine in response to a read request provided to a tri-state buffer of the termination system circuitry in accordance with one embodiment of the present invention.

FIG. 4 shows a logic diagram 400 illustrating the operations performed by the software termination engine in response to a read request provided to the tri-state buffer 310 as shown in FIG. 3A in accordance with one embodiment of the present invention. Initially, the method will begin at a decision operation 402 where it is determined whether a control bit has been received from the termination system circuitry after a read enable (RE) request. If it has not been received, the software termination engine 314 will wait until such receipt has arrived.

When the control bit is received, the method will proceed to a decision operation 404 where it is determined whether the controlled bit is a logical LOW. If it is a logical LOW, the method will proceed to an operation 406 where the software termination engine will communicate with a termination control decoder to set the termination 307 in a disabled state 406. On the other hand, if the control bit is not LOW, the software termination engine will communicate with the termination control decoder to effectively enable the termination 307 at operation 408. Once the termination for the host adapter has been set during the initial boot-up stage of a computer system, the operation performed by the software termination engine 314 will be done.

It should be appreciated that the software termination engine no longer needs to store a multiplicity of lookup tables for each existing host adapter and/or anticipate new configurations for future developments in host adapters. That is, the termination system circuitry 208 that is integrated directly as hardware into the host adapter chip 206 will ascertain what the data bits for termination are, and then will provide them to a generic software termination engine 314 which assists in setting the termination for the particular host adapter card.

Figure 5:
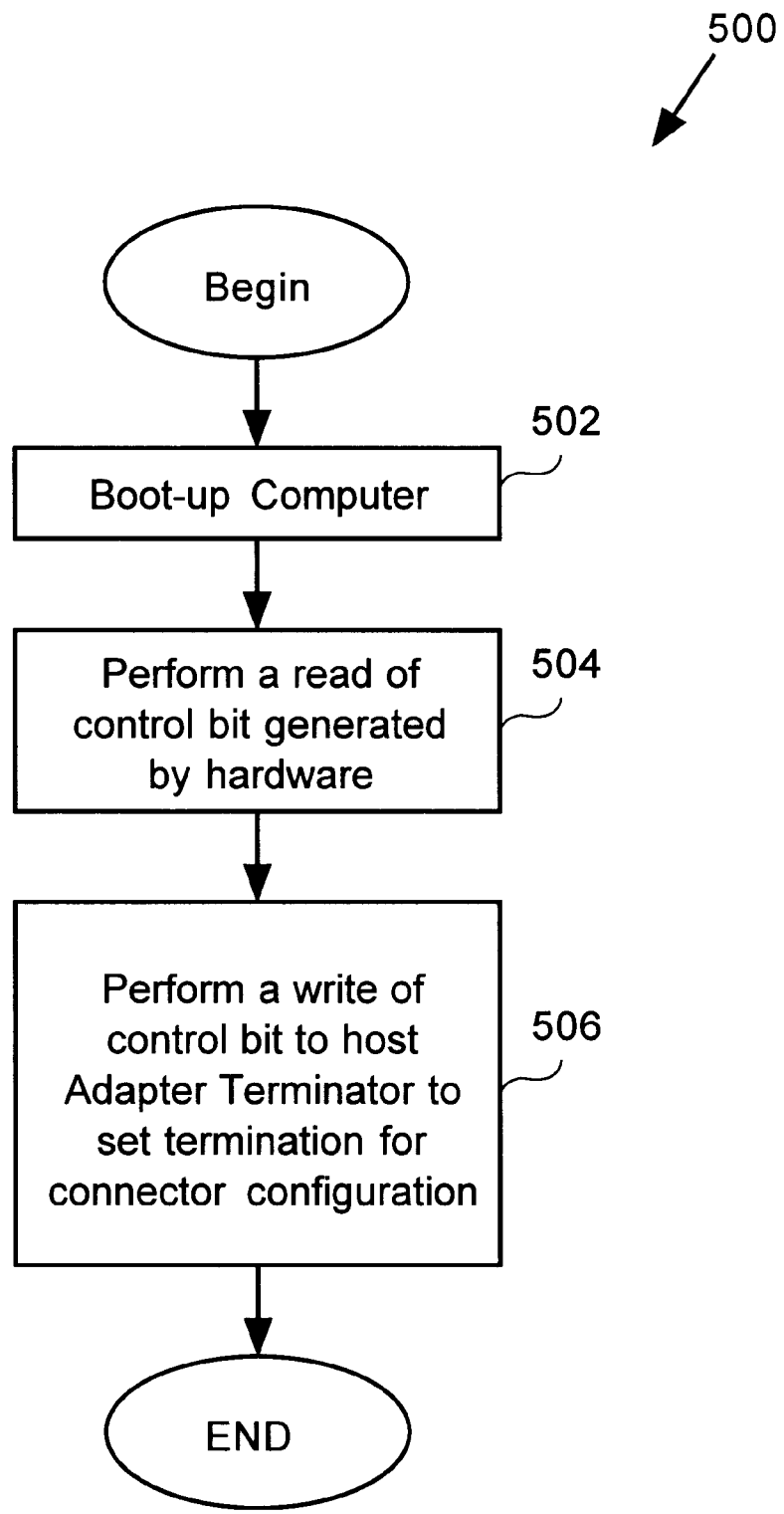
FIG. 5 shows a simplified flowchart illustrating the termination configuration performed during boot-up in accordance with one embodiment of the present invention.

FIG. 5 shows a simplified flowchart 500 illustrating the termination configuration performed during boot-up in accordance with one embodiment of the present invention. The method begins at an operation 502 where the computer is initially booted up. When the computer is booted up, a read of the controlled bit generated by the host adapter's hardware (i.e., termination system circuitry 208), will be performed. Once the control bit that was generated by the hardware is read by the termination software, the method will proceed to an operation 506. In operation 506, a write of the control bit to the host adapter terminator is performed to set the termination for the specific connector configuration.

Specifically, the hardware will initially perform the logical operations configured to determine when SCSI devices are connected to the various connectors of the host adapter card, and then provide that information as data bits to the software termination software which will then command the appropriate setting for the termination of the host adapter card. Once the write of the control bit to the host adapter terminator has been performed in operation 506, the method will end and proper data exchanges will be allowed to proceed along the properly terminated SCSI bus.

Figure 6A:
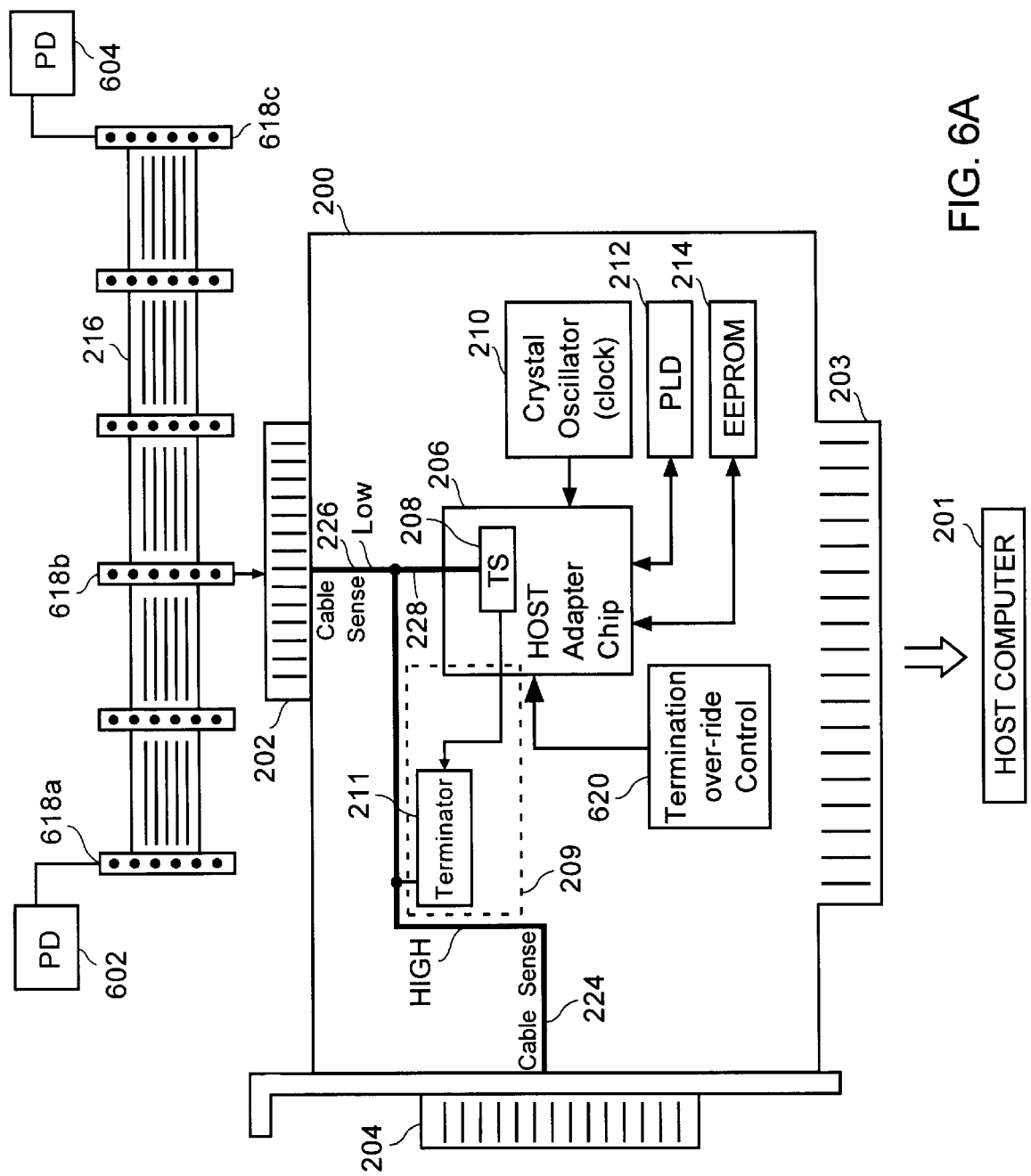
FIGS. 6A–6B illustrate an alternative embodiment in which a termination over-ride control is provided to disable the termination system circuitry in accordance with the present invention.

FIG. 6A illustrates an alternative embodiment in accordance with the present invention. As shown, the host adapter card 200 includes connectors 202 and 204. In this example, internal connector 202 is connected to a SCSI bus 216 at a connector 618b on the SCSI bus. Connected between connector 618b are peripheral devices 602 and 604 which are connected to connectors 618a and 618c. In this configuration, the termination system circuitry 208 will erroneously determine that the host adapter chip 206 is at one end of the SCSI bus.

However, the host adapter chip 206 in this example, is actually connected in the middle of the SCSI bus between the peripheral devices 602 and 604. Consequently, the termination system circuitry 208 will read the cable sense signal over the bus segment 224 to be in a logical HIGH state and the cable sense signal over the bus segment 226 to be in a logical LOW state. Based on the readings of the two bus segments 224 and 226 coming from connectors 204 and 202, the termination system circuitry 208 will erroneously determine that it defines one end of the SCSI bus and then enable its termination circuitry.

Figure 6B:
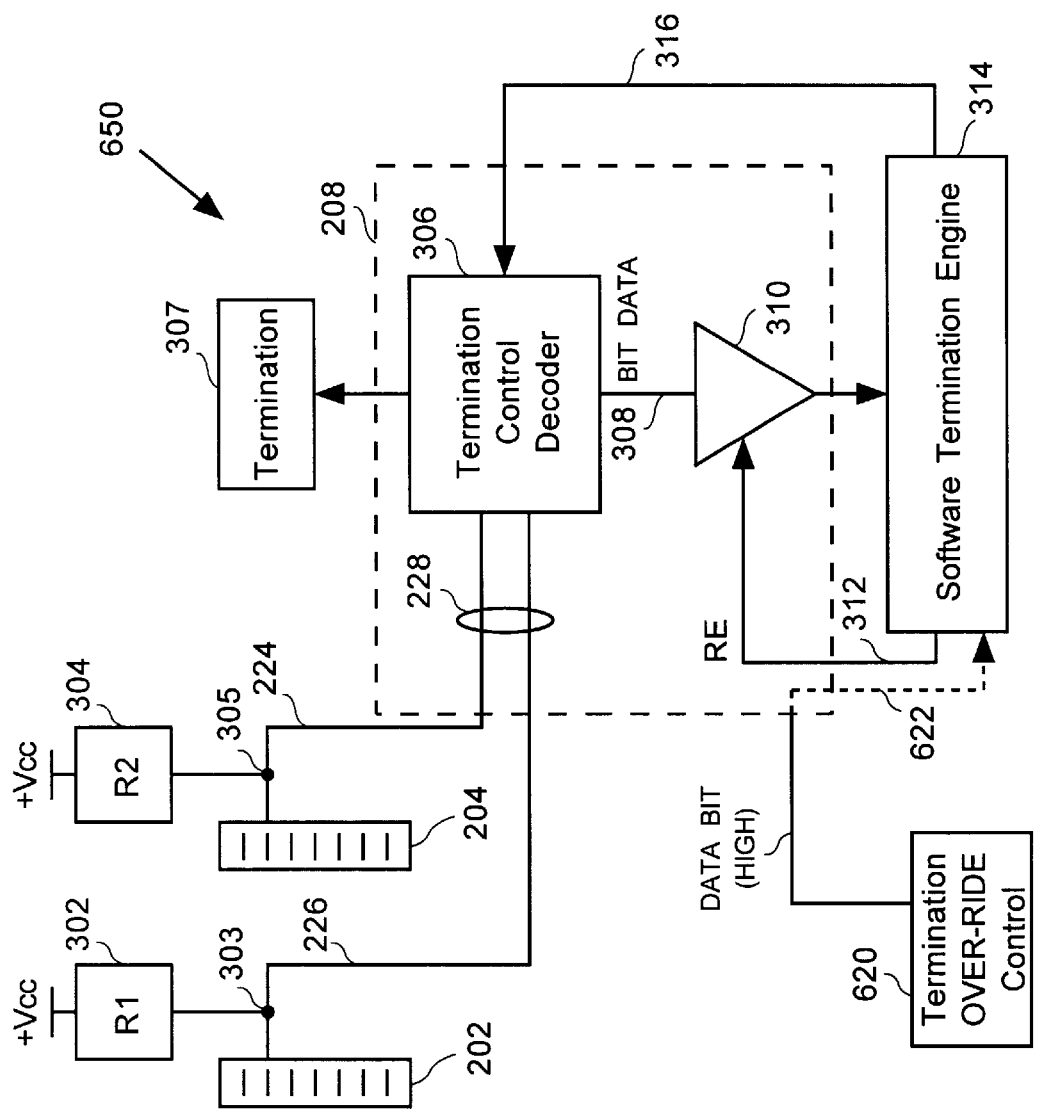

In cases where the SCSI bus 216 is connected as shown in FIG. 6A, the user may desire to over-ride the bit data provided by the termination system circuitry 208 and manually disable the terminator 211 of the host adapter 200. To accomplish this, the host adapter chip 206 is configured to receive termination over-ride control 620 directly from software that allows a manual over-ride when the automatic termination provided the termination system circuitry 208 is not appropriate. The termination over-ride control 220 is shown in greater detail in FIG. 6B below.

In this example, the termination over-ride control 620 will allow the input of a data bit that is in the form of a logical HIGH state over a control line 622 (in the case of 0 two connectors), which is provided directly to the software termination engine 314. The software termination engine 314 will therefore communicate the data bit logical HIGH state over line 316 to the termination control decoder 306, which will set the terminator 307 in a disabled state. In this embodiment, although the individual host adapters will have built-in termination system circuitry, the user of a particular system will still have the ability to over-ride an erroneously set termination state.

Therefore, the present invention provides the ability to automatically set the termination state of a host adapter using its built-in termination system circuitry that communicates bit data to generic termination software, however, the invention also allows the user to over-ride the hardware determined termination state. All of these advantages avoid the need for unique lookup tables that may not be able to address termination arrangements for a possibly infinite number of host adapters.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout.

The invention may employ various computer-implemented operations involving data stored in computer systems to drive computer peripheral devices (i.e., in the form of software drivers). These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A host adapter having automatic termination, comprising:

a first connector for connecting to at least one external peripheral device;

a second connector for connecting to at least one internal peripheral device; and a termination system circuit being coupled between the first connector and the second connector, the termination system circuit is configured to produce bit data that is indicative of whether a peripheral device is coupled to one or both of the first connector and the second connector, and the termination system circuit communicates the bit data to a software termination engine upon boot-up to enable or disable a termination of the host adapter.

2. A host adapter having automatic termination as recited in claim 1, wherein the termination system circuit further includes:

a termination control decoder; and a tri-state buffer.

3. A host adapter having automatic termination as recited in claim 2, wherein the termination control decoder includes a logical OR gate.

4. A host adapter having automatic termination as recited in claim 2, wherein a cable sense signal is received by the termination control decoder from each of the first connector and the second connector.

5. A host adapter having automatic termination as recited in claim 4, wherein when the cable sense signal is a logical HIGH for either the first connector or the second connector, no peripheral device is coupled to either the first connector or the second connector.

6. A host adapter having automatic termination as recited in claim 5, wherein when the cable sense signal is a logical LOW for either the first connector or the second connector, the peripheral device is coupled to either the first connector or the second connector.

7. A host adapter having automatic termination as recited in claim 6, wherein the termination control decoder generates the bit data to be a logical LOW when at least one peripheral device is connected to each of the first connector and the second connector.

8. A host adapter having automatic termination as recited in claim 7, wherein the bit data that is the logical LOW is passed from the termination control decoder to the tri-state buffer and then communicated to the software termination engine that disables the termination of the host adapter.

9. A host adapter having automatic termination as recited in claim 1, further including a termination over-ride control that is configured to over-ride the automatic termination generated by the termination system circuit.

10. A host adapter having automatic termination as recited in claim 9, wherein the termination over-ride control communicates directly with the software termination engine to disable or enable the termination of the host adapter.

11. A method for performing automatic termination of a host adapter having a first connector and a second connector, comprising:

detecting a first cable sense signal from the first connector;

detecting a second cable sense signal from the second connector;

analyzing the first cable sense signal and second cable sense signal to produce a bit data that is indicative of an enabling or disabling of a single termination of the host adapter; and setting the enabling or disabling of the termination upon boot-up of a host computer system that has received the bit data from the host adapter.

12. A method for performing automatic termination of a host adapter as recited in claim 11, further comprising:

receiving a logical LOW from the first cable sense signal when at least one peripheral device is connected to the first connector; and receiving a logical LOW from the second cable sense signal when at least one peripheral device is connected to the second connector.

13. A method for performing automatic termination of a host adapter as recited in claim 12, further comprising:

receiving a logical HIGH from the first cable sense signal when no peripheral device is connected to the first connector; and receiving a logical HIGH from the second cable sense signal when no peripheral device is connected to the second connector.

14. A method for performing automatic termination of a host adapter as recited in claim 13, wherein when the analyzing determines that the logical LOW is received from both the first cable sense signal and the second cable sense signal, the setting will disable the termination of the host adapter.

15. A method for performing automatic termination of a host adapter as recited in claim 13, wherein when the analyzing determines that the logical LOW is received from both the first cable sense signal and the second cable sense signal, the setting will disable the termination of the host adapter.

16. A method for performing automatic termination of a host adapter as recited in claim 13, wherein when the analyzing determines that the logical LOW is received from one of the first cable sense signal and the second cable sense signal and that the logical HIGH is received from one of the first cable sense signal and the second cable senses signal, the setting will enable the termination of the host adapter.

17. A method for performing automatic termination of a host adapter as recited in claim 11, wherein upon boot-up of the host computer system, a read of the bit data is made in order initiate a write of the bit data that produces the setting of the enabling or disabling of the termination of the host adapter.

18. A method for performing automatic termination of a host adapter as recited in claim 11, further comprising:

initiating an over-ride of the setting of the enabling or disabling of the termination to force the host adapter into a user defined termination state.

19. A host adapter card having automatic termination, comprising:

a first connector means for connecting to at least one external peripheral device;

a second connector means for connecting to at least one internal peripheral device; and a termination system means being coupled between the first connector means and the second connector means, the termination system means is configured to produce bit data that is indicative of whether a peripheral device is coupled to one or both of the first connector means and the second connector means, and the termination system means communicates the bit data to a software termination engine upon boot-up to enable or disable a termination means of the host adapter.

20. A host adapter card having automatic termination as recited in claim 19, wherein the termination system means further includes:

a termination control decoding means; and a buffer means.

21. A host adapter card having automatic termination as recited in claim 20, wherein a cable sense signal is received by the termination control decoding means from each of the first connector means and the second connector means.

22. A host adapter having automatic termination, comprising:

a first connector for connecting to at least one external peripheral device;

a second connector for connecting to at least one internal peripheral device;

a termination system circuit being coupled between the first connector and the second connector, the termination system circuit is configured to produce bit data that is indicative of whether a peripheral device is coupled to one or both of the first connector and the second connector, and the termination system circuit communicates the bit data to a software termination engine upon boot-up to enable or disable a termination of the host adapter; and a termination over-ride control that is configured to override the automatic termination generated by the termination system circuit.

23. A host adapter having automatic termination as recited in claim 22, wherein the termination over-ride control communicates directly with the software termination engine to disable or enable the termination of the host adapter.

24. A host adapter having automatic termination, comprising:

a first connector for connecting to at least one external peripheral device;

a second connector for connecting to at least one internal peripheral device;

a termination system circuit being coupled between the first connector and the second connector, the termination system circuit is configured to produce bit data that is indicative of whether a peripheral device is coupled to one or both of the first connector and the second connector, and the termination system circuit communicates the bit data to a software termination engine that is in the form of code on a host computer upon boot-up to enable or disable a termination of the host adapter that is connected to the host computer.

* * * * *